United States Patent
Kenney et al.

(10) Patent No.: US 6,741,665 B2
(45) Date of Patent: May 25, 2004

(54) METHOD AND APPARATUS PROVIDING AN AMPLITUDE INDEPENDENT AUTOMATIC FREQUENCY CONTROL CIRCUIT

(75) Inventors: Thomas J. Kenney, San Diego, CA (US); Jukka Tapaninen, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/177,186

(22) Filed: Jun. 20, 2002

(65) Prior Publication Data
US 2003/0235258 A1 Dec. 25, 2003

(51) Int. Cl.$^7$ ............................................. H04L 27/06

(52) U.S. Cl. ..................... 375/344; 375/147; 375/148; 375/144

(58) Field of Search ................................ 375/148, 344, 375/144, 347, 327, 340, 332, 130; 370/342, 335

(56) References Cited

U.S. PATENT DOCUMENTS

| | | | | |
|---|---|---|---|---|
| 5,179,578 A | * | 1/1993 | Ishizu .......................... | 375/332 |
| 5,402,451 A | * | 3/1995 | Kaewell et al. .............. | 375/347 |
| 5,812,615 A | | 9/1998 | Baum et al. .................. | 375/344 |
| 5,878,093 A | | 3/1999 | Molnar et al. ................ | 375/347 |
| 6,278,725 B1 | * | 8/2001 | Rouphael et al. ............. | 375/148 |
| 6,304,620 B1 | | 10/2001 | Rouphael ...................... | 375/344 |

OTHER PUBLICATIONS

Fuyun Ling, "Convergence and Output of Digital Frequency–Locked Loop for Wireless Communications", IEEE Trans. On Comm., pp. 1215–1219, May 1996.

* cited by examiner

*Primary Examiner*—Stephen Chin
*Assistant Examiner*—Curtis Odom
(74) *Attorney, Agent, or Firm*—Thomas Weber; Harrington & Smith, LLP

(57) ABSTRACT

An automatic frequency control (AFC) loop circuit (1A, 1B) includes a mixer (2) for mixing a local oscillator signal (3) with a received signal to generate a result signal; a frequency detector (5) coupled to the result signal and outputting a loop error signal; a combiner circuit (9) for combining error signals output from a plurality of fingers (12, 14, 16) of a rake receiver (220) with the loop error signal output from the frequency detector to generate a combined loop error signal; a sign detector (10) having an input coupled to an output of said combiner circuit for outputting a sign detector output signal for indicating a sign of the combined loop error signal; control circuitry (7, 8) for controlling a frequency of the local oscillator signal in accordance with the sign detector output signal and a loop filter (6) partitioned into a first loop filter (6A) coupled between the output of the frequency detector and an input to the sign detector, and a second loop filter (6B) coupled between an output of the sign detector and an input to the control circuitry. In one embodiment the first loop filter is coupled between the output of the frequency detector and an input to the combiner circuit, while in another embodiment the first loop filter is coupled between the output of the combiner circuit and the input to the sign detector. The loop bandwidth is controlled with the loop filter, and the total required amount of loop filtering is split between the first loop filter and the second loop filter. In the preferred embodiment the combiner circuit comprises a Maximal Ratio Combining (MRC) circuit.

18 Claims, 3 Drawing Sheets

METHOD AND APPARATUS PROVIDING AN AMPLITUDE INDEPENDENT AUTOMATIC FREQUENCY CONTROL CIRCUIT

TECHNICAL FIELD

These teachings relate generally to closed loop control systems and, more specifically, relate to frequency control loops such as automatic frequency control (AFC) circuits used in communications and other types of systems.

BACKGROUND

Coherent wireless communication receivers typically utilize an AFC or a FLL (frequency-locked loop) circuit to synchronize the frequency of a receiver to that of a transmitter.

The task of the AFC circuit is twofold. First, the AFC circuit must provide an initial frequency acquisition mode of operation, where large initial differences or errors between the transmitter frequency and the receiver frequency are reduced in value. Second, the AFC circuit must provide a frequency tracking or maintenance mode of operation, where the AFC circuit continuously attempts to drive the frequency error between the receiver and transmitter to zero in order to provide robust communications. AFC circuits are used in many wireless technologies including narrowband and wideband Code Division Multiple Access (CDMA) and Time Division Multiple Access (TDMA) systems. Examples of these systems include IS-95, IS-2000 (WCDMA) and GSM. In current standards a WCDMA system operates with a 5 MHz bandwidth, while a narrowband CDMA system operates with a 200 kHz bandwidth. AFC circuits are also used in television receivers, cable modems and a number of other types of systems wherein it is required to synchronize the operating frequency of a receiver to a received signal.

A conventional Digital AFC (DAFC) loop 1 is shown in FIG. 1. Reference can also be made to Fuyun Ling, "Convergence and Output of Digital Frequency-Locked Loop for Wireless Communications," IEEE Trans. On Comm., May 1996. The DAFC loop 1 includes a mixer 2 that mixes a reference frequency output from a voltage controlled oscillator (VCO) 3 with that of an incoming received signal. The DAFC loop 1 further includes an analog to digital A/D converter 4, a frequency detector 5, a loop filter 6, an integrator 7, and a digital to analog converter (DAC) 8 that generates a frequency control voltage for the VCO 3. During operation the AFC loop 1 attempts to maintain, at the output of the integrator 7, a voltage that is proportional to the frequency offset that is present on the received signal. The A/D converter 4 samples and converts an analog signal output from the mixer 2 to a digital signal. The digital signal samples are sent to the frequency detector 5 which computes a difference, more precisely the $1^{st}$ derivative, between successive samples. The output of the frequency detector 5 is analogous to the loop error signal. In the steady-state the output of the frequency detector 5 is (ideally) zero. Following the frequency detector 5 is the loop filter 6 that filters the error signal prior to the input of the integrator 7. In a multi-finger (multi-demodulator) rake receiver embodiment the frequency error outputs of those fingers having acceptable signal quality, as determined elsewhere in the receiver, are added in at summing junction 9. The composite signal is then input to the integrator circuit 7. At the output of the integrator 7 is the DAC 8, which converts the digital signal output from the integrator 7 to an analog signal or voltage. The DAC 8 then drives the VCO 3 with an analog voltage having a value that is proportional to the output frequency, thereby closing the DAFC control loop.

U.S. Pat. No. : 5,812,615, "Apparatus and method for maximizing frequency offset tracking performance in a digital receiver", Baum et al., discloses in FIG. 5 the use of sign determination circuits prior to a filter of an AFC unit used with a phase locked loop (PLL). An AFC unit includes a subtracter operating as a mixer, and the sign detectors detect phase errors that are mapped to one of +1, 0, −1 values. The mapping process removes the amplitude information from a differential phase error and from a coherent phase error signal, while preserving the sign.

A problem that exists in the prior art results from the fact that conventional AFC circuits are typically optimized for use with a limited range of input signal levels, and compromises are thus made for signal levels outside of that range. These compromises tend to lead to a loss in performance.

A further problem relates to the fact in at least one design the frequency detector 5 is implemented using an arctan function (see Heinrich Meyr, Marc Moeneclaey, Stefan A. Fechtel, "Digital Communication Receivers-Synchronization, Channel Estimation, and Signal Processing," John Wiley & Sons, Inc. 1998, pp. 478–481). While this approach generates a loop error signal that is substantially insensitive to signal level, this approach would not allow the loop to operate optimally in a rake receiver that uses Maximal Ratio Combining (MRC) of the frequency errors from different fingers.

A still further problem that is inherent in the prior art approach is in the combining of the frequency detector output and signal filtering, as scaling, normalization or limiting of the signal is required. In the prior art a normalization by the number of active fingers and limiting of the signal amplitude is typically required.

SUMMARY OF THE PREFERRED EMBODIMENTS

The foregoing and other problems are overcome, and other advantages are realized, in accordance with the presently preferred embodiments of these teachings.

This invention provides an automatic frequency control loop circuit that includes a mixer for mixing a local oscillator signal with a received signal to generate a result signal; a frequency detector coupled to the result signal and outputting a loop error signal; a combiner circuit for combining error signals output from a plurality of fingers of a rake receiver with the loop error signal output from the frequency detector to generate a combined loop error signal; a sign detector having an input coupled to an output of the combiner circuit for outputting a sign detector output signal for indicating a sign of the combined loop error signal; control circuitry for controlling a frequency of the local oscillator signal in accordance with the sign detector output signal and a loop filter partitioned into a first loop filter coupled between the output of the frequency detector and an input to the sign detector, and a second loop filter coupled between an output of the sign detector and an input to the control circuitry. In one embodiment the first loop filter is coupled between the output of the frequency detector and an input to the combiner circuit, while in another embodiment the first loop filter is coupled between the output of the combiner circuit and the input to the sign detector. The loop bandwidth is controlled with the loop filter, and the total required amount of loop filtering is split between the first loop filter and the second loop filter. In the preferred embodiment the combiner circuit is implemented as a Maximal Ratio Combining (MRC) circuit.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The presently preferred embodiments of this invention are described below in the exemplary and non-limiting context of a WCDMA embodiment, specifically one known as the IS-2000 system. In the IS-2000 system coherent demodulation in the downlink from the base station to the mobile station is achieved using a pilot channel/signal. This same pilot channel signal is also used in the frequency detector to estimate the frequency error for the AFC loop.

Figure 1:
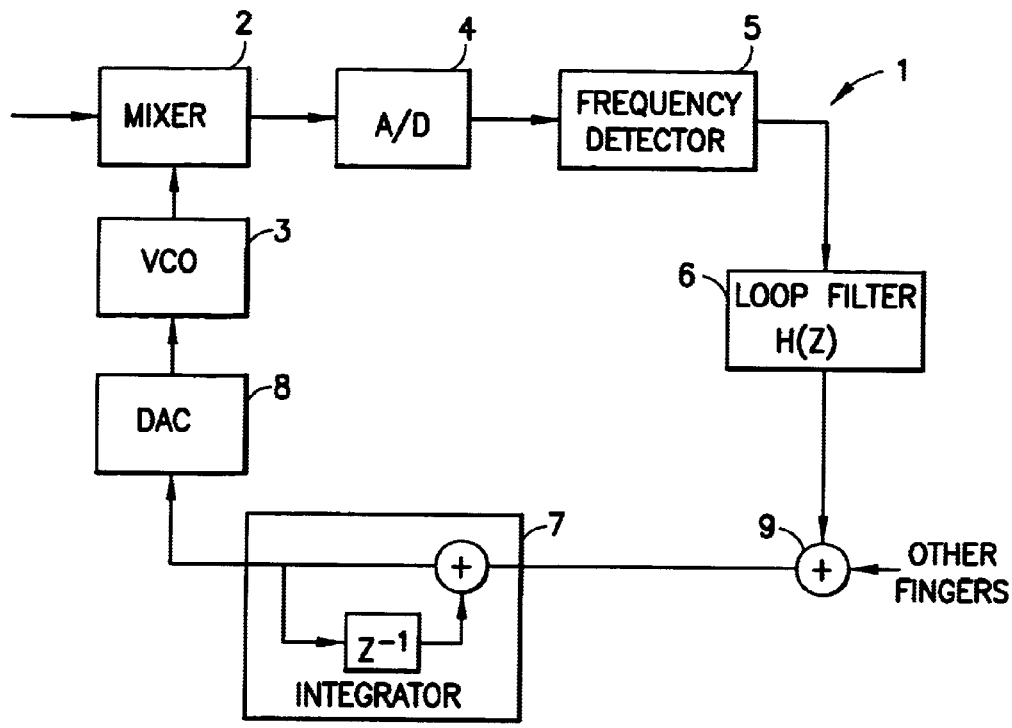
FIG. 1 is block diagram of a conventional AFC loop circuit.
Figure 2:
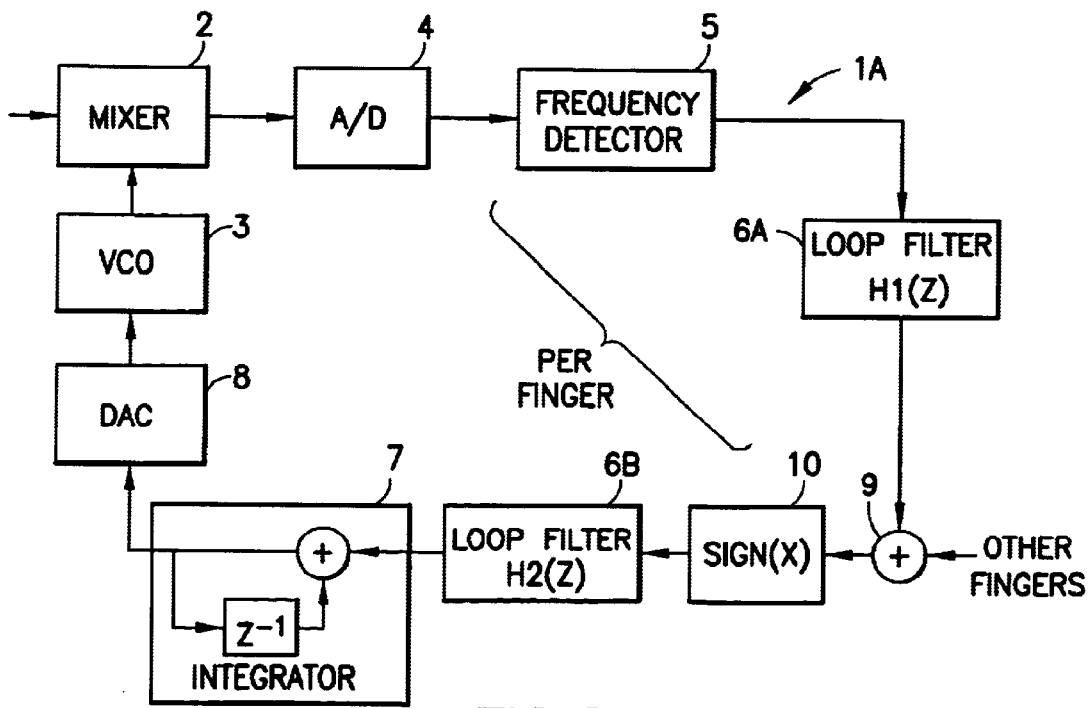
FIG. 2 is a block diagram of a first embodiment of an AFC loop circuit in accordance with this invention.

FIG. 2 shows a first embodiment of the improved AFC loop circuit 1A. The AFC loop circuit 1A maybe constructed using the components shown in FIG. 1, and are designated accordingly. To the conventional component blocks are added additional circuit blocks. First, the loop filter H(z) 6 is partitioned into two filter blocks designated loop filter H1(z) 6A and loop filter H2(z) 6B. Note that the frequency detector 5 and the loop filter H1(z) 6A are located in each finger 12, 14, 16 (see FIG. 4).

A further additional circuit block is a sign detection block referred to as sign(x)10. The sign detection block 10 removes the signal amplitude dependency in the AFC loop circuit 1A by outputting a bipolar binary signal of +1 or −1, depending on whether the output of the frequency detector 5 is greater than or less than zero, respectively. The sign detection block 10 outputs a zero if its input is zero. This affords predictable performance of the AFC loop circuit 1A under all signal conditions, as the amplitude of the loop error signal is ignored, and only the sign of the loop error signal is considered.

The loop filter H1(z) 6A (actually one per rake finger) is placed between the output of the frequency detector 5 and the input to the rake error signal combiner 9, and is used to filter the signal before the sign detection block 10, providing an increased SNR prior to the sign detection block 10. The second loop filter H2(z) 6B is placed between the output of the signal combiner 9, after the sign(x) block 10, and the input to the integrator 7. In a preferred, but non-limiting embodiment, the total required filter function of the loop filter 6 of FIG. 1 is split between the loop filter H1(z) 6A and the loop filter H2(z) 6B.

In the preferred rake receiver embodiment the rake finger loop error signals are added together prior to the sign detection block 10 by the error signal combiner 9. Referring also to FIG. 4, there is shown a simplified diagram of a multi-finger 12, 14, 16 rake receiver containing fingers 1, 2, ..., n having outputs coupled to the rake error signal combiner 9 of the AFC control loop 1A. In this embodiment a signal is received through an antenna 240 (see FIG. 5), is amplified by a Low Noise Amplifier (LNA) 240A and is coupled to the mixer 2. The output of the A/D converter 4 then feeds each of the fingers 12, 14, 16. Each finger 12, 14, 16 preferably comprises a plurality of despreaders or correlators (e.g., early, late, on-time, data) for removing the Walsh code assigned to the receiver. One of the correlators is a pilot channel correlator and removes the pilot channel code (e.g., the Walsh function zero code). In the embodiment of FIG. 2 the frequency detector 5 and the H1(z) filter 6A are included in each of the fingers 12, 14 and 16 and operate on the pilot channel signal, while in the embodiment of FIG. 3, discussed below, only the frequency detector 5 is included in each finger. More specifically, each finger 12, 14, 16 is enabled to track the pilot channel signal arriving by a different propagation path (i.e., multi-path). The pilot channel-related frequency error outputs of the active fingers 12, 14, 16 are applied to the combiner 9, which then supplies the combined finger error signals to the remaining components, i.e., to the sign detector 10, second loop filter 6B (or the first and second loop filters 6A and 6B for the embodiment of FIG. 3), the integrator 7, the DAC 8 and the VCO 3. The output of the VCO 3 is the mixing frequency signal that is applied to the mixer 2, thereby closing the loop.

A significant advantage of this approach is that by adding the rake finger signals prior to the sign detection block 10 there is provided a Maximal Ratio Combining of the rake finger signals. This is true because the pilot channel gain is weighted by signal strength, and the strongest pilot channel signal will therefore dominate the MRC output of the combiner 9. Thus, the output of the sign detection block 10 represents the sign of the result of the MRC of the pilot channel signals from various rake fingers 12, 14, 16.

Figure 3:
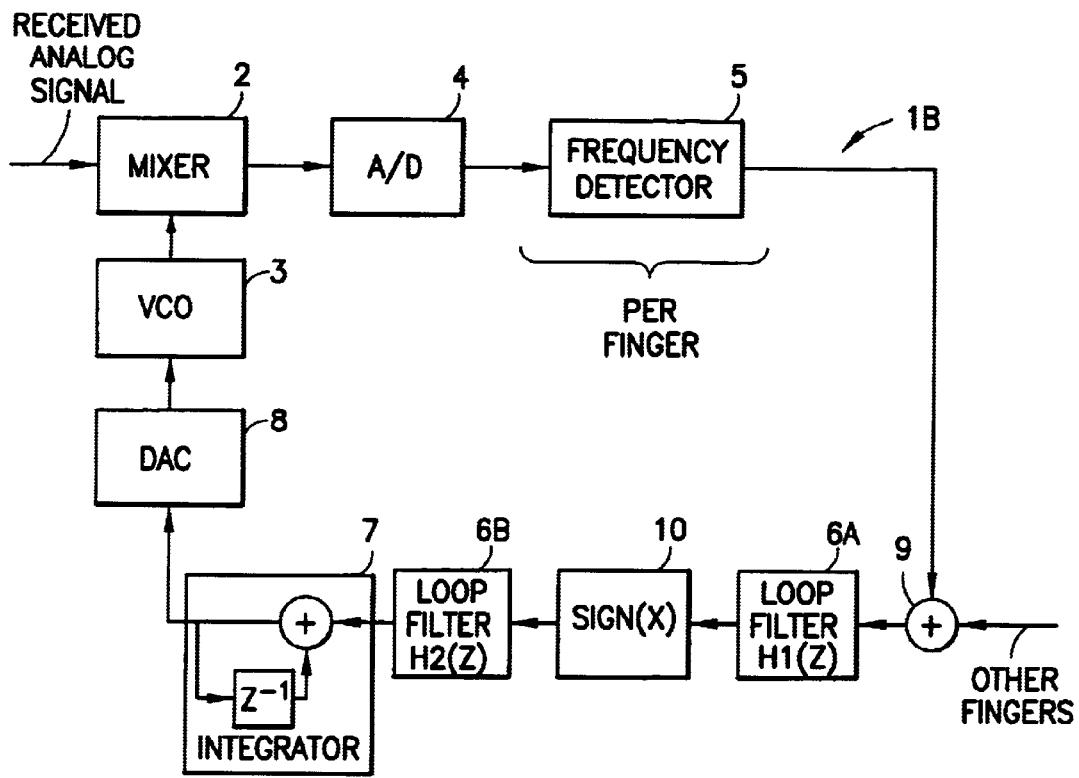
FIG. 3 is a block diagram of a second embodiment of an AFC loop circuit in accordance with this invention.
Figure 4:
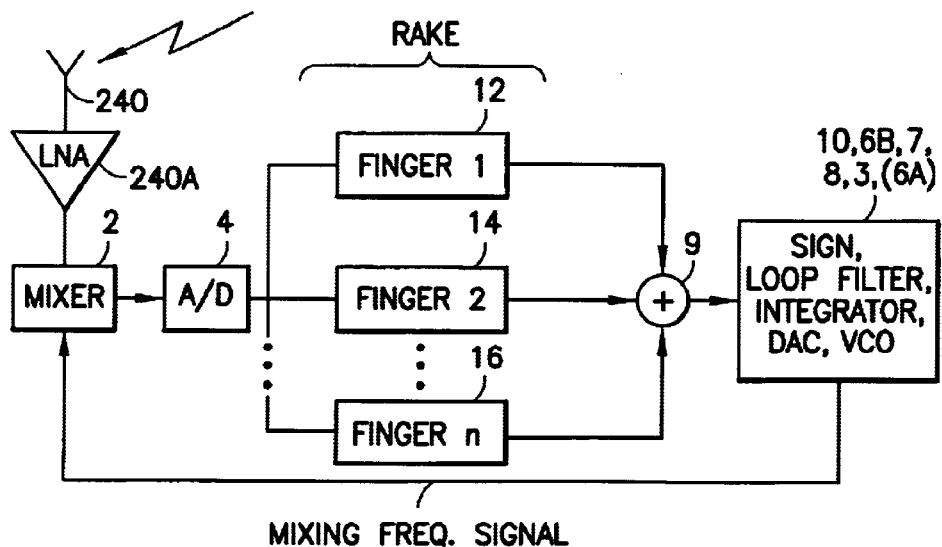
FIG. 4 shows a plurality of rake fingers having outputs coupled to the AFC circuit of FIG. 2 or FIG. 3.

FIG. 3 illustrates a second, presently preferred embodiment of the AFC control loop 1B. In this embodiment the first loop filter H1(z) 6A is positioned after the combining or summation block 10 for the rake fingers 12, 14, 16. The circuit architecture depicted in FIG. 3 provides all of the benefits described above for the embodiment of FIG. 2, with the additional advantage of reduced implementation complexity. This reduction in implementation complexity is realized by having only one common H1(z) filter 6A that serves all of the rake fingers 12, 14, 16 (after the MRC operation in block 9), as opposed to having n H1(z) filters 6A corresponding to n rake fingers as in the embodiment of FIG. 2.

As a non-limiting example, the H1(z) filter 6A may be a relatively simple first order integrate and dump type filter, while the second H2(z) filter 6A may be a relatively simple first order gain multiplier filter.

Figure 5:
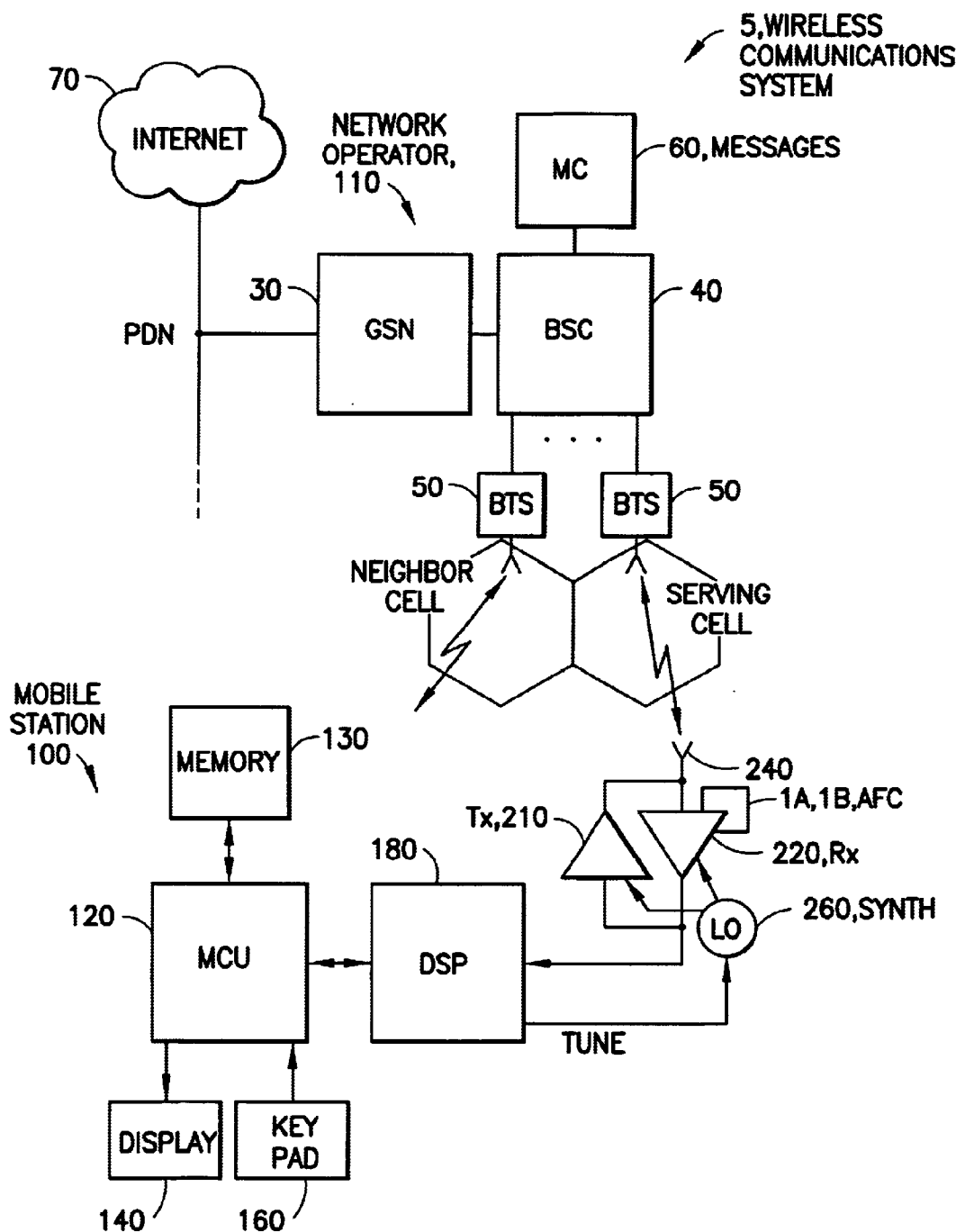
FIG. 5 is a block diagram of a wireless communication system that includes a mobile station constructed to include the AFC loop circuit of either the embodiment of FIG. 2 or FIG. 3.

Referring to FIG. 5, there is illustrated a simplified block diagram of an embodiment of a wireless communications system that is suitable for practicing this invention. The wireless communications system includes at least one mobile station (MS) 100. FIG. 5 also shows an exemplary network operator 110 having, for example, a GPRS Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator 110, which conveys mobile originated access requests and traffic. The network operator 110 may also include a suitable type of Message Center (MC) 60 that receives and forwards messages for the mobile stations 100.

The air interface standard can conform to any suitable standard or protocol, and may enable both voice and data traffic, such as data traffic enabling Internet 70 access and web page downloads. In the presently preferred embodiment of this invention the air interface standard is a CDMA air interface, such as the IS-2000 air interface, although other types of CDMA and WCDMA systems can be accommodated, as can a TDMA air interface that supports, as an example, a GSM or an advanced GSM protocol and air interface.

The mobile station 100 typically includes a microcontroller (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. The ROM is assumed, for the purposes of this invention, to store a program enabling the MCU 120 to execute the software routines, layers and protocols required for operation with the wireless network of the network operator 110, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

The receiver 220 is assumed, for the presently preferred embodiment of this invention, to be a multi-finger rake receiver, as shown in FIG. 4, and includes the improved AFC control circuit 1A or 1B, as shown in FIGS. 2 and 3.

The improved AFC control circuit 1A, 1B operates to pull-in a large frequency offset during acquisition at various input signal levels, where the pull-in time is insensitive to the input signal level.

It has been shown that the improved AFC control circuit 1A, 1B, in accordance with this invention may employ the components discussed above with relation to FIG. 1. However, the conventional circuit architecture is enhanced and extended by the inclusion of the sign detection block 10 at the output of the frequency detector 5, just prior to the loop filter 6B. The sign detection block 10 removes the amplitude dependency of the signal input to the loop filter 6B, thereby providing a more robust loop. The loop filter 6A, 6B may then be designed based on the specifications required by the application of interest, and functions in a predictable manner for all input signal conditions. More specifically, the pull-in speed of the control loop is made substantially linear, and the slope of the control loop is governed by a single parameter, the loop gain.

The conventional circuit architecture is further enhanced and extended by combining the frequency error from each of the fingers in the multi-finger rake receiver 220 using, in the presently preferred embodiments, Maximal Ratio Combining (MRC) techniques in the combining block 9 prior to the sign detection block 10. This provides an improved performance in the rake receiver 220, as compared to the prior art. More specifically, the MRC technique is known to be an optimal signal combining scheme for maximizing the signal-to-noise ratio (SNR) of the signal.

Still further, the preferred embodiment employs the plurality of loop filters 6A, 6B in series with the sign detection block 10, with one being placed prior to the sign detection block 10, which functions as a hard limiter, and another after the sign detection block 10. This approach increases the SNR at the output of the frequency detector 5 prior to the sign detection block 10, thereby further improving performance.

The use of the sign detection block 10 results in facilitating the combining of the frequency detector 5 output and the signal filtering, as no scaling, normalization or limitation of the combined rake finger signal is required prior to the sign detection block 10. As was noted above, in the prior art a normalization by the number of active fingers, and limiting of the signal amplitude, is typically required.

It should thus be apparent that the teachings of this invention provide a significant advantage over the prior art AFC circuits by providing a technique whereby the AFC circuit 1A, 1B is insensitive to the amplitude of the input signal. This allows a more robust circuit, which behaves in a deterministic manner irrespective of the input signal. Additionally, since the AFC is essentially a control loop, the loop bandwidth is typically controlled with the loop filter 6. The design of the loop filter 6 and its bandwidth are thus critical elements in a wireless receiver. Since the loop is inherently dependent on the input signal level in conventional circuit designs, the loop circuit is typically designed for a range of input signal levels, and signals outside of the design range suffer prom a loss of performance. In the presently preferred embodiments, since the AFC control loop 1A, 1B is designed to be insensitive to the signal amplitude, the loop filter design is greatly simplified, and the loop performs in a deterministic manner irrespective of the input signal level. In addition, using MRC for generating the frequency error signal provides for optimal operation in the rake receiver 220. Additionally, the implementation of the improved AFC loop circuit is simplified, since no normalization or scaling of the signal is needed.

While described in the context of circuitry that includes analog signals, it is within the scope of these teachings to implement the AFC loop circuits 1A and 1B using only digital techniques, such as by suitably programming the DSP 180 in conjunction with external support circuitry, if required.

Thus, while the invention has been particularly shown and described with respect to preferred embodiments thereof, it will be understood by those skilled in the art that changes in form and details may be made therein without departing from the scope and teachings of the invention.

What is claimed is:

1. An automatic frequency control loop circuit, comprising:

a mixer for mixing a local oscillator signal with a received signal to generate a result signal;

a frequency detector coupled to the result signal and outputting a loop error signal;

a combiner circuit for combining error signals output from a plurality of fingers of a rake receiver with the loop error signal output from the frequency detector to generate a combined loop error signal;

a sign detector having an input coupled to an output of said combiner circuit for outputting a sign detector output signal for indicating a sign of the combined loop error signal;

control circuitry for controlling a frequency of the local oscillator signal in accordance with the sign detector output signal; and a loop filter partitioned into a first loop filter coupled between the output of the frequency detector and an input to the sign detector, and a second loop filter coupled between an output of the sign detector and an input to the control circuitry.

2. An automatic frequency control loop circuit as in claim 1, where the first loop filter is coupled between the output of the frequency detector and an input to the combiner circuit.

3. An automatic frequency control loop circuit as in claim 1, where the first loop filter is coupled between the output of the combiner circuit and the input to said sign detector.

4. An automatic frequency control loop circuit as in claim 1, where the combiner circuit comprises a Maximal Ratio Combining circuit.

5. An automatic frequency control loop circuit as in claim 1, where a loop bandwidth is controlled with the loop filter, and where a total required amount of loop filtering is split between the first loop filter and the second loop filter.

6. A method for operating an automatic frequency control loop, comprising:

mixing a local oscillator signal with a received signal to generate a result signal;

frequency detecting the result signal and outputting a loop error signal;

combining error signals output from a plurality of fingers of a rake receiver with the loop error signal and generating a combined loop error signal;

sign detecting the combined loop error signal; and controlling a frequency of the local oscillator signal in accordance with the detected sign;

further comprising filtering a signal present in the control loop with a filter partitioned into a first loop filter that filters the loop error signal and a second loop filter that filters the combined loop error signal.

7. A method as in claim 6, where combining comprises Maximal Ratio Combining.

8. A method for operating an automatic frequency control loop, comprising:

mixing a local oscillator signal with a received signal to generate a result signal;

frequency detecting the result signal and outputting a loop error signal;

combining error signals output from a plurality of fingers of a rake receiver with the loop error signal and generating a combined loop error signal;

sign detecting the combined loop error signal for generating a sign detection signal; and controlling a frequency of the local oscillator signal in accordance with the sign detection signal;

further comprising filtering a signal present in the control loop with a filter partitioned into a first loop filter that filters the combined loop error signal and a second loop filter that filters the sign detection signal.

9. A method as in claim 8, where combining comprises Maximal Ratio Combining.

10. A mobile station comprising an antenna having an output coupled to a multi-finger rake receiver and further comprising an automatic frequency control loop circuit, said automatic frequency control loop circuit comprising a mixer for mixing a local oscillator signal with a received signal to generate a result signal; a frequency detector coupled to the result signal and outputting a loop error signal; a combiner circuit for combining error signals output from at least some of said plurality of fingers of said rake receiver with the loop error signal output from the frequency detector to generate a combined loop error signal; a sign detector having an input coupled to an output of said combiner circuit for outputting a sign detector output signal for indicating a sign of the combined loop error signal; control circuitry for controlling a frequency of said local oscillator signal in accordance with said sign detector output signal; and a loop filter partitioned into a first loop filter coupled between the output of said frequency detector and an input to said sign detector, anti a second loop filter coupled between an output of said sign detector and an input to said control circuitry.

11. A mobile station as in claim 10, where said first loop filter is coupled between the output of said frequency detector and an input to said combiner circuit.

12. A mobile station as in claim 10, where said first loop filter is coupled between the output of said combiner circuit and said input to said sign detector.

13. A mobile station as in claim 10, where said combiner circuit comprises a Maximal Ratio Combining circuit.

14. A mobile station as in claim 10, where a loop bandwidth is controlled with said loop filter, and where a total required amount of loop filtering is split between said first loop filter and said second loop filter.

15. A mobile station as in claim 10, where said received signal comprises a pilot channel signal received from a base station of a wireless communications system operating in accordance with a code division multiple access air interface protocol.

16. A wideband code division multiple access WCDMA mobile station comprising an antenna having an output coupled to a multi-finger rake receiver and further comprising an automatic frequency control loop circuit, said automatic frequency control loop circuit comprising a mixer for mixing a local oscillator signal with a received signal to generate a result signal; a frequency detector in each finger having an input coupled to said result signal and outputting a frequency error signal indicating a received and despread pilot channel finger frequency error; a Maximal Ratio Combining MRC circuit for combining error signals output from at least some fingers of said multi-finger rake receiver to generate a combined loop error signal; a sign detector having an input coupled to an output of said MRC circuit for outputting a sign detector output signal for indicating a sign of said combined loop error signal and not an amplitude of said combined loop error signal; control circuitry for controlling a frequency of said local oscillator signal in accordance with said sign detector output signal; and a loop filter partitioned into a first loop filter coupled between the output of said frequency detector and an input to said sign detector, and a second loop filter coupled between an output of said sign detector and an input to said control circuitry.

17. A mobile station as in claim 16, where said first loop filter is coupled between the output of said frequency detector in each finger of said multi-finger rake receiver and an input to said MRC circuit.

18. A mobile station as in claim 16, where said first loop filter is coupled between the output of said MRC circuit and said input to said sign detector.

* * * * *